(12) United States Patent
Kim et al.

(10) Patent No.: US 9,122,761 B2
(45) Date of Patent: Sep. 1, 2015

(54) BUSINESS ENTITY SEARCHING AND AUTOMATIC DIALING FOR SMARTPHONES

(71) Applicants: Sang Kwon Kim, Tigard, OR (US); Daniel M Kim, Tigard, OR (US)

(72) Inventors: Sang Kwon Kim, Tigard, OR (US); Daniel M Kim, Tigard, OR (US)

(*) Notice: Subject to any disclaimer, the term of this patent is extended or adjusted under 35 U.S.C. 154(b) by 0 days.

(21) Appl. No.: 14/497,502

(22) Filed: Sep. 26, 2014

(65) Prior Publication Data

US 2015/0095325 A1    Apr. 2, 2015

Related U.S. Application Data

(60) Provisional application No. 61/884,378, filed on Sep. 30, 2013.

(51) Int. Cl.
*G06F 17/30* (2006.01)
*H04L 29/08* (2006.01)

(52) U.S. Cl.
CPC ............ *G06F 17/3087* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,392,411 B2* | 3/2013 | Lebeau et al. | 707/723 |
| 2002/0097844 A1* | 7/2002 | Mahoney | 379/88.03 |
| 2004/0203642 A1* | 10/2004 | Zatloukal et al. | 455/414.1 |
| 2005/0097189 A1* | 5/2005 | Kashi | 709/217 |
| 2005/0262435 A1* | 11/2005 | Ramanujan | 715/513 |
| 2007/0111713 A1* | 5/2007 | Silverbrook et al. | 455/414.1 |
| 2008/0222127 A1* | 9/2008 | Bergin | 707/5 |
| 2010/0035652 A1* | 2/2010 | Wu | 455/558 |
| 2011/0289064 A1* | 11/2011 | Lebeau et al. | 707/706 |
| 2013/0191363 A1* | 7/2013 | LeBeau et al. | 707/706 |
| 2014/0134982 A1* | 5/2014 | Adams | 455/414.1 |
| 2014/0143728 A1* | 5/2014 | Coleman et al. | 715/835 |

* cited by examiner

*Primary Examiner* — Hung Le
(74) *Attorney, Agent, or Firm* — Mark S Hubert

(57) ABSTRACT

Business entity search results are provided for smartphones for automatic dialing. Search results are provided based on partial business entity name and location information. Search results are trimmed to only include name, address, and phone number. A smartphone is adapted to display search results concisely allowing the user to quickly identify and call the desired business entity.

6 Claims, 8 Drawing Sheets

BUSINESS ENTITY SEARCHING AND AUTOMATIC DIALING FOR SMARTPHONES

CLAIM FOR DOMESTIC PRIORITY

This application claims the benefit of U.S. Provisional Patent Application No. 61/884,378 filed Sep. 30, 2013 and under 35 U.S.C. §120 claims the benefit thereof.

BACKGROUND OF THE INVENTION

The present invention relates to telecommunications and in particular to searching via wireless mobile telephones.

There are numerous computerized systems and multi-media device applications that can be utilized to find a telephone number for a commercial entity. Some are voice activated while typing in a "search" field initiates others. The smartphone search engines often glean information from numerous databases, and the user must scan through the website's and/or the application's results to find the correct commercial entity, often having to link to a business's website to eventually dial the correct telephone number for him/herself. This can be a slow tedious process, especially on the small user interface (screen) of a smartphone.

Voice activated search engines available on smartphones are rudimentary, and do not function well—confusing similarly sounding words, and simply misinterpreting the user's spoken words. Additionally, they do not work adequately for users with accents, or those speaking with a regional dialect, exhibiting alcohol induced slurring, or possessing speech impediments.

SUMMARY OF THE INVENTION

The general purpose of the present invention, which will be described subsequently in greater detail, is to provide a simple, refined search interface adapted to receive and display search results in a simplified name, address, telephone number only format. Accordingly, one aspect of the present invention is providing a computer program for searching, retrieving, trimming, and displaying business entity contact information and automatic dialing of the desired business entity, based on a partial business entity name and location data. The smartphone is adapted to display the search results concisely. Since smartphones have a small screen, streamlining the amount of information displayed to the user, increases user satisfaction, as the information presented is visually uncluttered, allowing the user to quickly identify the search results.

DETAILED DESCRIPTION

Figure 1:
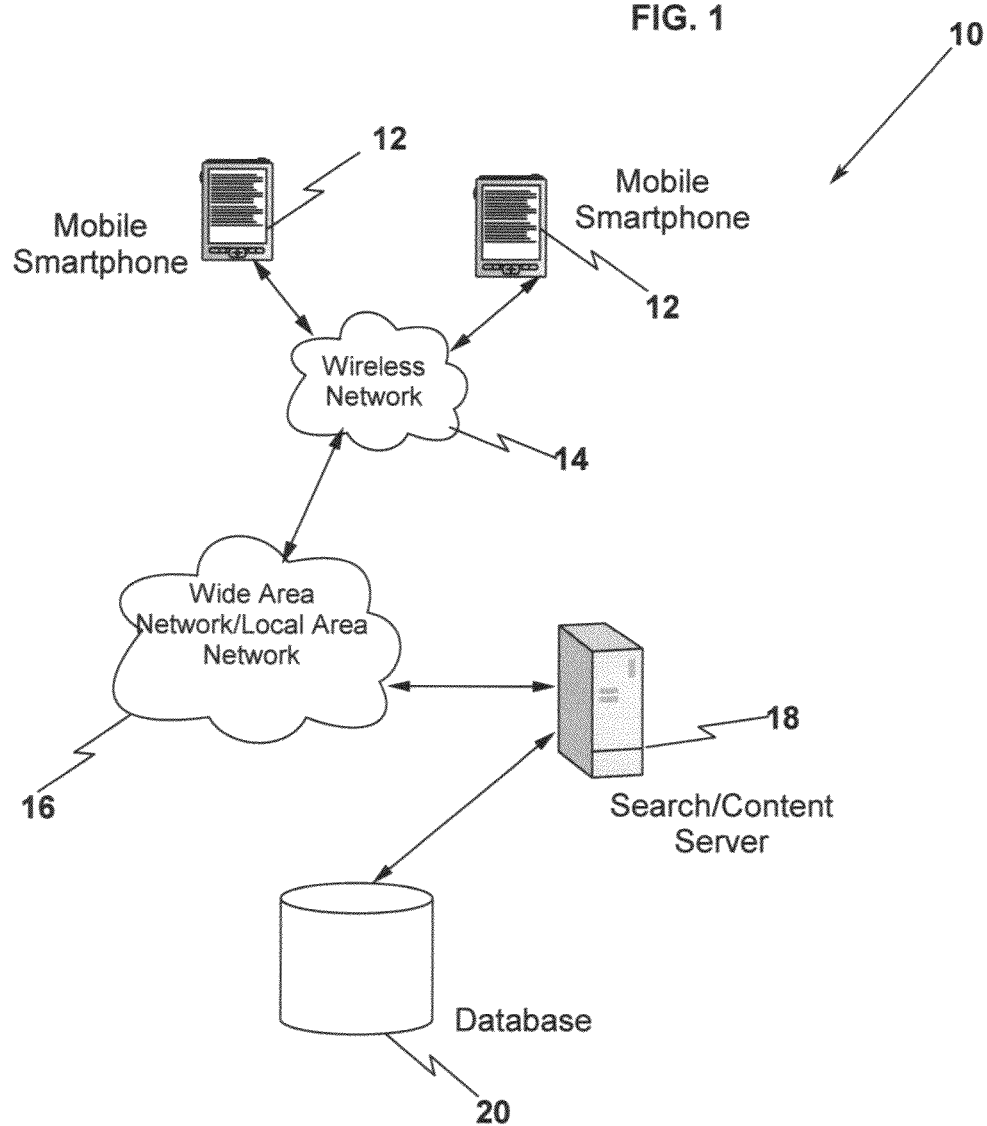
FIG. 1 is a system diagram of an exemplary environment in which the present invention may be practiced.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Looking at FIG. 1 the components of an exemplary environment in which the business entity searching and automatic dialing of the present invention may operate is illustrated. Environment 10 includes mobile smartphone(s) 12, a wireless network 14 for coupling/connecting smartphones 12 with a WAN/LAN network 16, a search/content server 18, and a remote database 20.

"Mobile smartphone" means any web-enabled mobile phone. While the term "smartphone" is well known in the art, smartphones typically include a touch sensitive screen, a messaging client, global positioning systems (GPS) technology or any other geo-position mechanisms to determine the physical coordinates of the smartphone, and a browser application. The browser application employs any web-based language such as JavaScript Object Notation (JSON), JavaScript, HyperText Markup Language (HTML), or any other web-based programming language capable of sending and displaying messages, search queries, and search query results.

Wireless network 14 is configured to couple smartphones 12 with network 16 and may include one or more sub-networks such as mesh networks and cellular networks. Wireless network 14 may employ any access technology for voice and data communication between smartphones 12 such as Wifi, 3G, 4G, 4G LTE, WLAN, etc.

Search/content server 18 manages data and services that are usable and/or available to smartphones 12. Search/content server 18 provides searching, data sorting and filtering of data, which may include web-content, audio recordings, video content, text content, etc. Services may include applications for download, email services, SMS, IM services, photo services, etc.

Network 16 is configured to couple search/content server 18 with smartphones 12 through wireless network 14. Network 16 can include local area networks (LAN), wide area networks (WAN), and can also include the Internet. Remote database 20 stores business entity information and is coupled to search/content server 18 via network 14.

Figure 2:
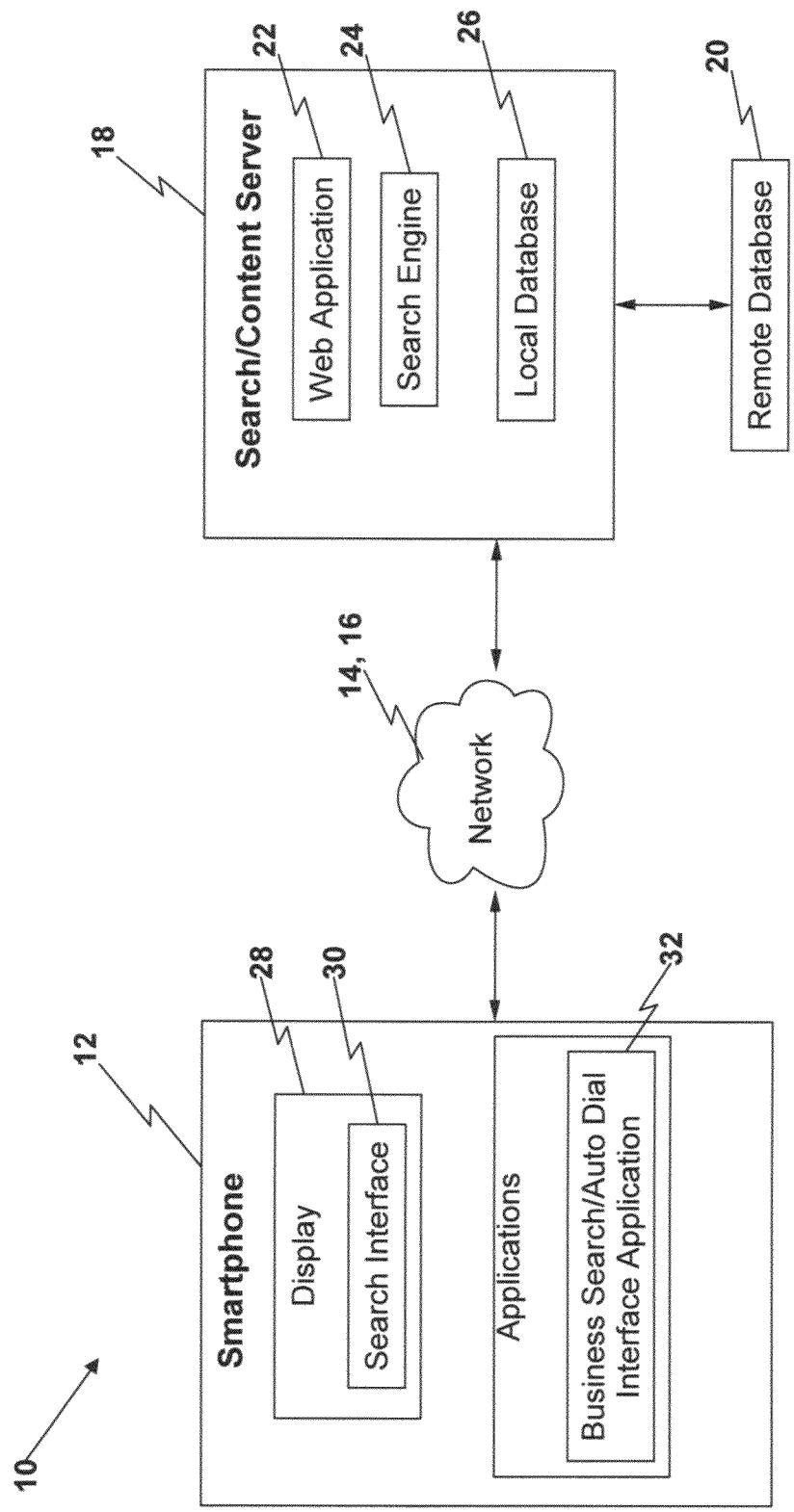
FIG. 2 is an exemplary network architecture diagram showing aspects capable of implementing the business entity searching and automatic dialing of the present invention.

FIG. 2, while still simplified, expands upon the exemplary environment 10 illustrated in FIG. 1. Search/content server 18 is coupled/operatively connected to smartphone 12 via networks 14, 16 for preforming business entity searching and automatic dialing of the present invention. Search/content server 18 includes a search engine 24 and web-server application 22, wherein the web server application allows server 18 to communicate with smartphone 12, enabling smartphone 12 to access search engine 24 through network 14, 16. Search engine 24 process search queries from smartphone 12 and may retrieve query results from a local database 26 or a remote database 20.

Smartphone 12 includes a display 28. Business search/auto dial interface application 32 is a computer application that when executed by a processor displays a search interface 30 within display 28. Search interface 30 allows a user of smartphone 12 to enter a business entity's name or partial name for searching of local database 26 or remote database 20 via search engine 24. Search interface 30 will display results of a search in a concise: name, address, and telephone number format, maximizing the small physical area of display 28. Business search/auto dial interface application 32 trims and formats the results for display, minimizing extraneous information potentially gleaned from a search. Business search/auto dial interface application 32 employs JSON scripting to send the search query and to trim the search results to attain the concise formatting/display and will not displaying exhaustive results in various formats.

Figure 3:
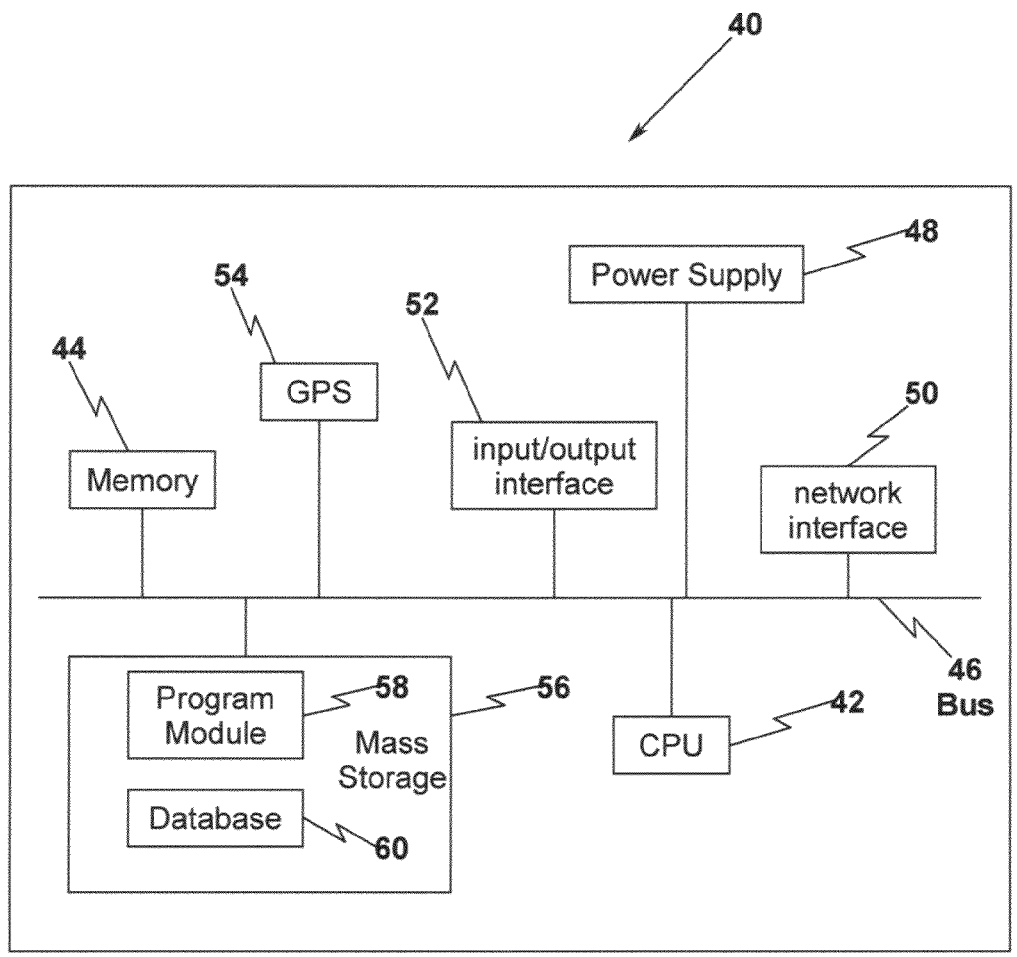
FIG. 3 is an exemplary computer architecture diagram showing aspects of computer hardware architecture capable of implementing the business entity searching and automatic dialing of the present invention.

Looking at FIG. 3 a simplified, exemplary computer architecture illustrating possible components (all well known and understood in the art) of computer 40 for carrying out business entity searching and automatic dialing of the present invention is shown. Computer 40 could include both smartphone 12 and search/content server 18. Computer 40 includes a central processing unit (CPU) 42 in communication with a memory 44 via Bus 46. Computer 40 also includes a power supply 48, a network interface 50, input/output interface 52, and GPS 54. Mass storage 56 provides non-volatile storage for computer 40, and stores program modules 58 and database 60. Mass storage device is coupled to CPU 42 via mass storage controller (not shown). Network interface 50 includes circuitry for coupling computer 40 to one or more networks, and is constructed for use with one or more communication protocols. Input/Output devices could include a keyboard (virtual or hard), microphone, a mouse, etc.

Example program modules 58 may include search engine 24, web server application 22, and business search/auto dial interface application 32. Database 60 may include remote database 20 and local database 26.

Figure 7:
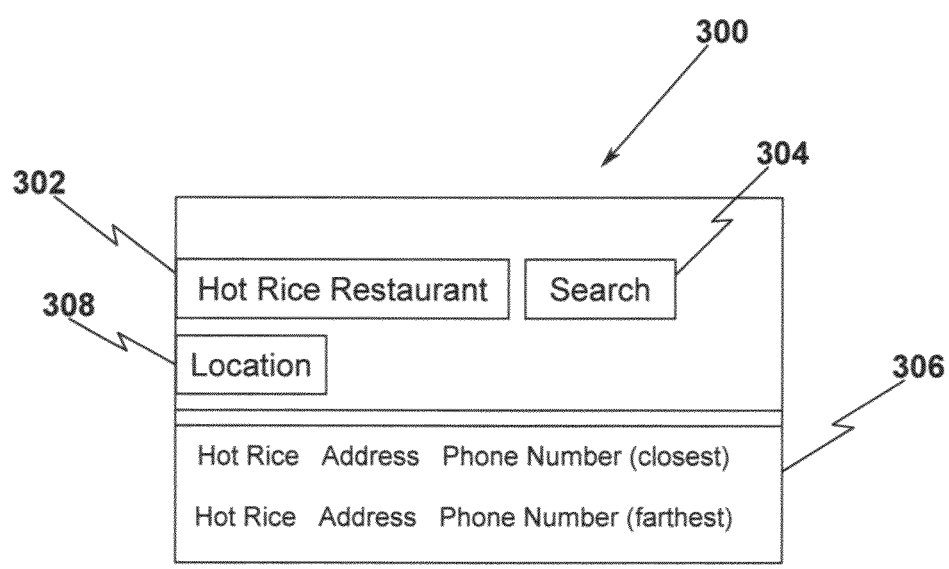
FIG. 7 is an exemplary screen display diagram showing the results of an illustrative search.

In operation (FIGS. 4-7) search interface 30 allows the user of smartphone 12 to input a search term (i.e. business entity) and display the results of the search in display 28. A sample screen shot 300 is shown in FIG. 7, illustrating an exemplary implementation of the search interface 30, and includes a search term entry-window 302, for a user to enter a business entity, a search/submission button 304 to initiate the search (instructing the smartphone 12 to transmit a request to retrieve results to the search/content server 18) based on the entry into entry-window 302. An example business entity name "Hot Rice" example is illustrated in FIG. 7.

Figure 4:
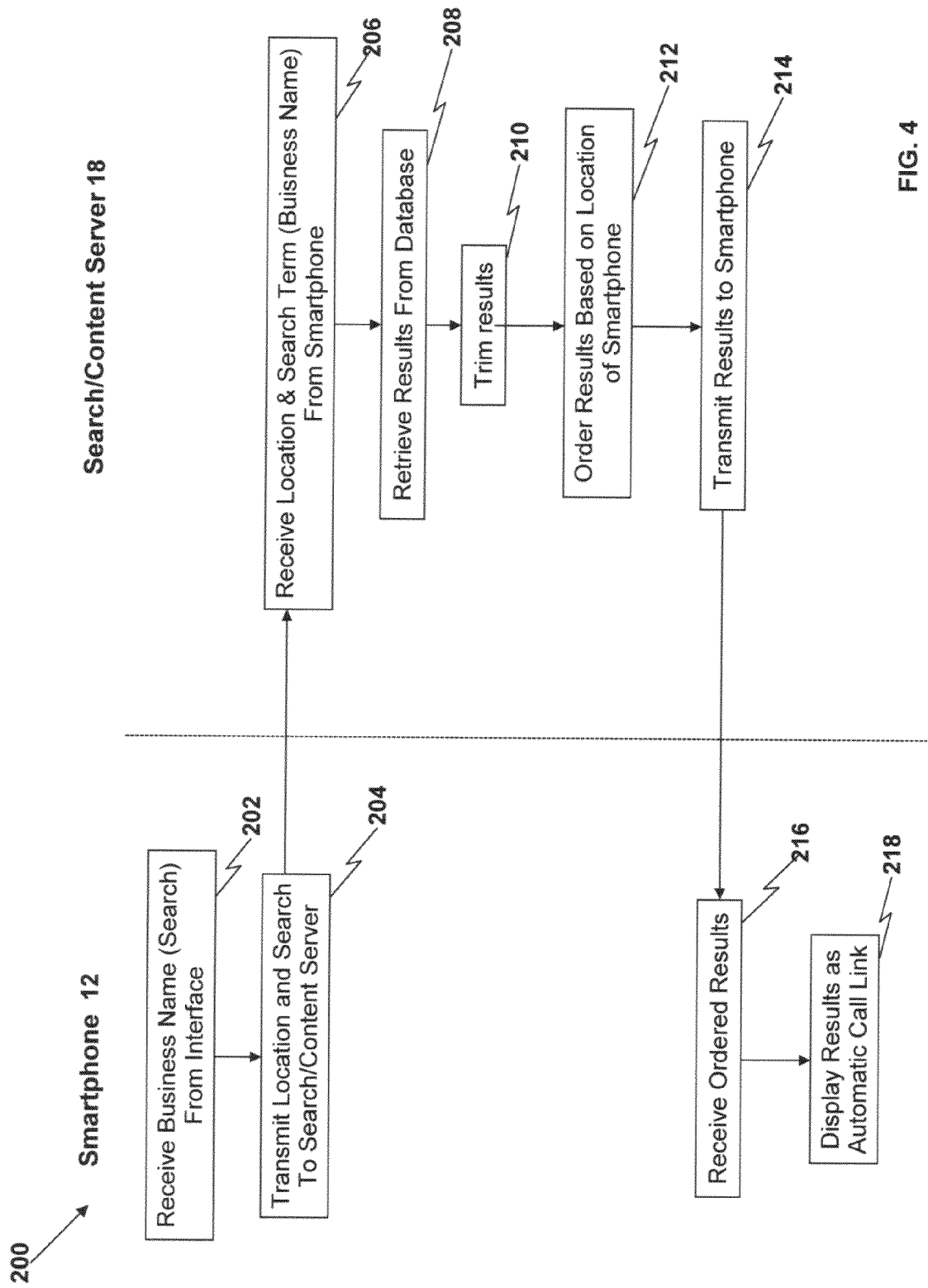
FIG. 4 is a flow diagram showing the general process for the business entity searching and automatic dialing for smartphones.

FIG. 4 illustrates the method business search/auto dial interface application 32, implements for providing business entity search results to a smartphone 12. The method illustrated in FIG. 4 is operations implemented by a set of logical instructions carried out/running on a computer system. Routine 200 begins upon receiving an entry in entry-window 302 and initiating the business entity search via search/submission button 304 (step 202). Business entity search and smartphone location information is transmitted over network 16 to search content server 18 (step 204). Server 18 receives from smartphone 12 the search request to retrieve results from querying local and/or remote database 26, 20 (step 206). At step 208 results are retrieved. Routine 200 then proceeds to step 210 wherein server computer 18 trims the results. The results are then ordered based on the physical location (GPS data) of smartphone 12 (step 212). Server 18 then transmits the trimmed and order results to smartphone 12 (step 214). Smartphone 12 receives (over the network 16) the results from server 18 (step 216). Routine 200 then proceeds to operation 218, displaying the results are retrieved business search/auto dial interface application 32 then trims, orders the results, and transmits them back to smartphone 12 for display within the result-display 306 (see FIG. 7).

Figure 5:
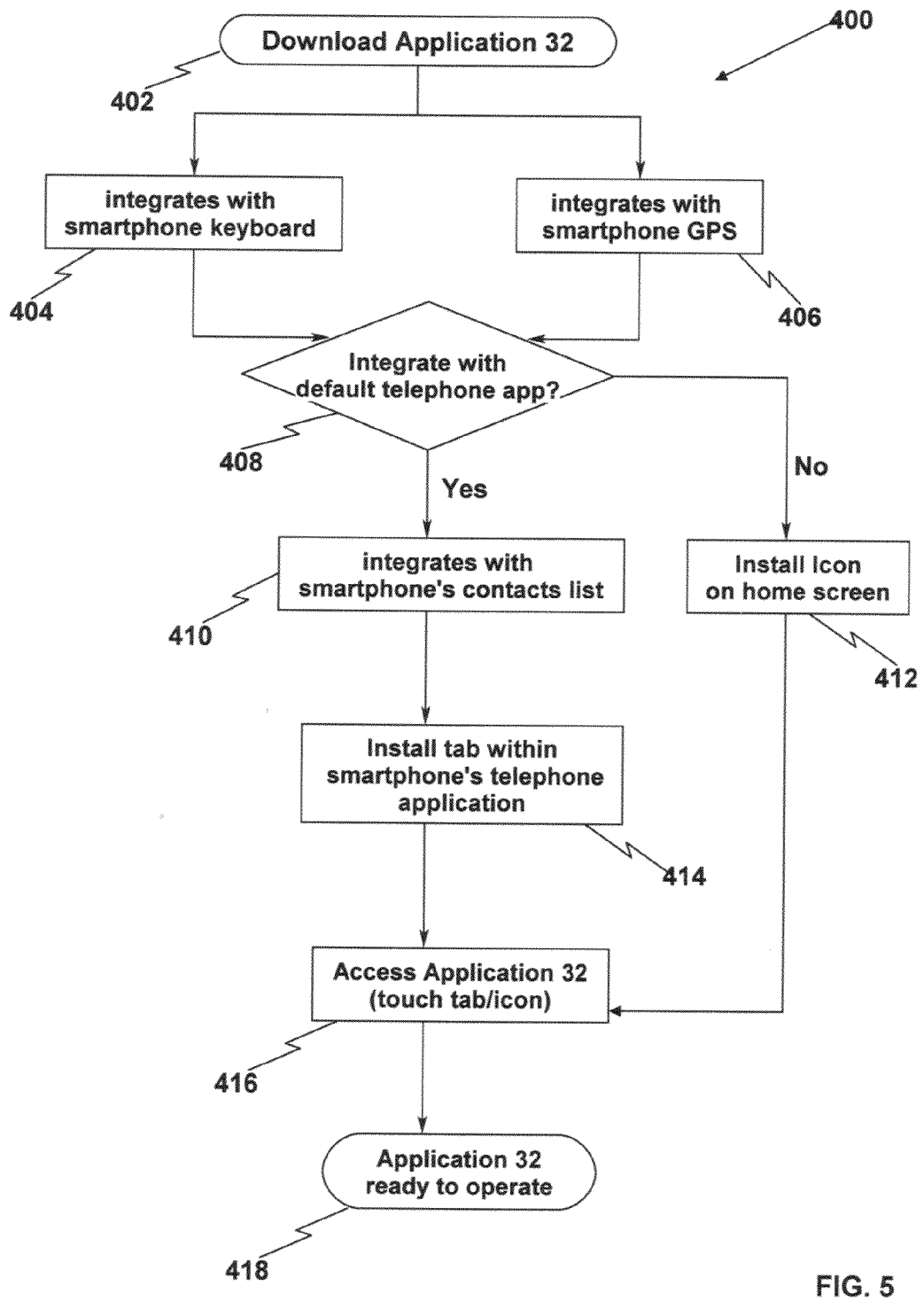
FIG. 5 is a flow diagram illustrating the general process for installing the business entity searching and automatic dialing application of the present invention on a smartphone.
Figure 6:
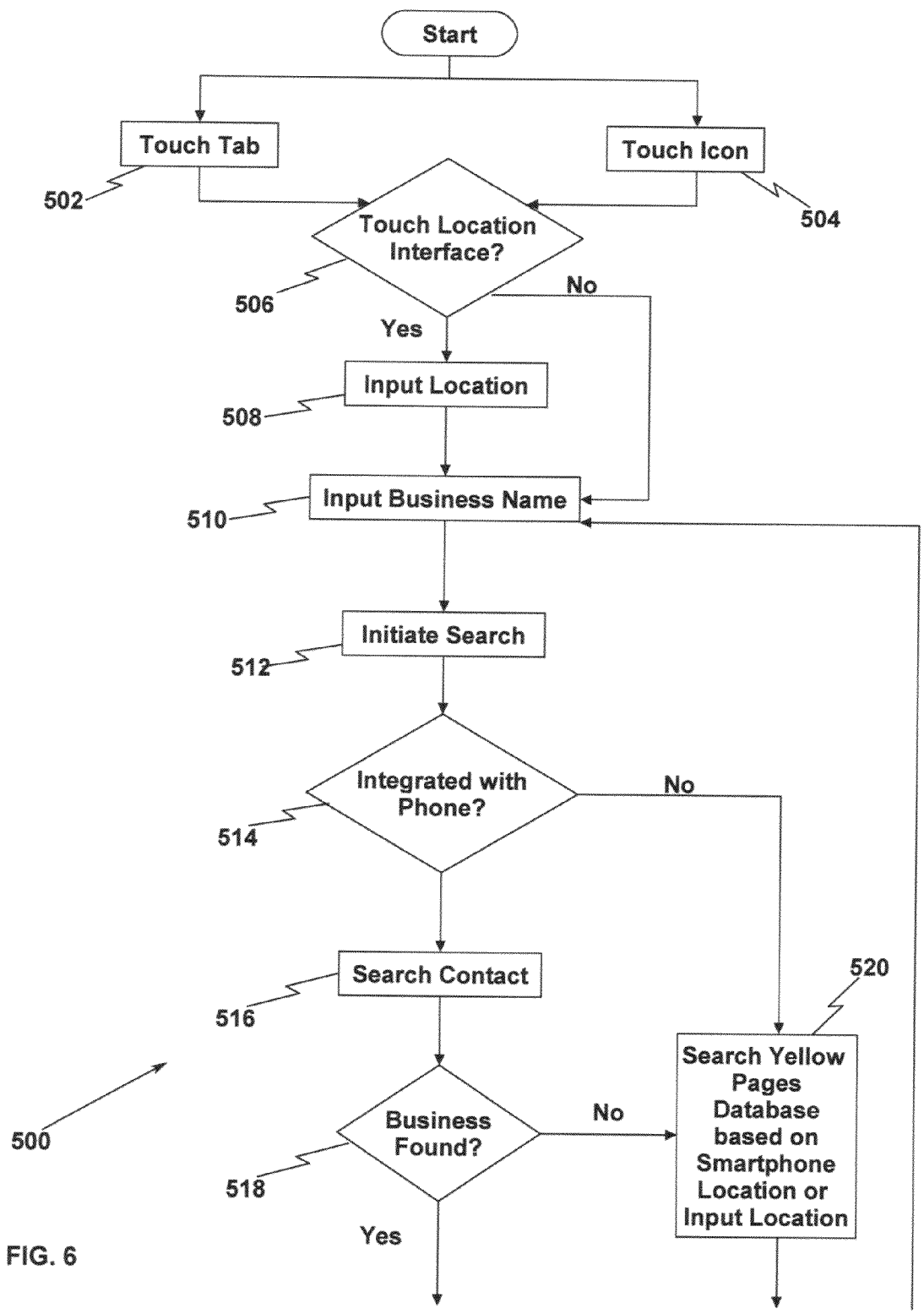
FIG. 6 is a flow diagram illustrating the steps followed by the automated telephone directory and dialing system of the present invention for obtaining search results for a business entity search and dialing a business entity.
Figure 6:
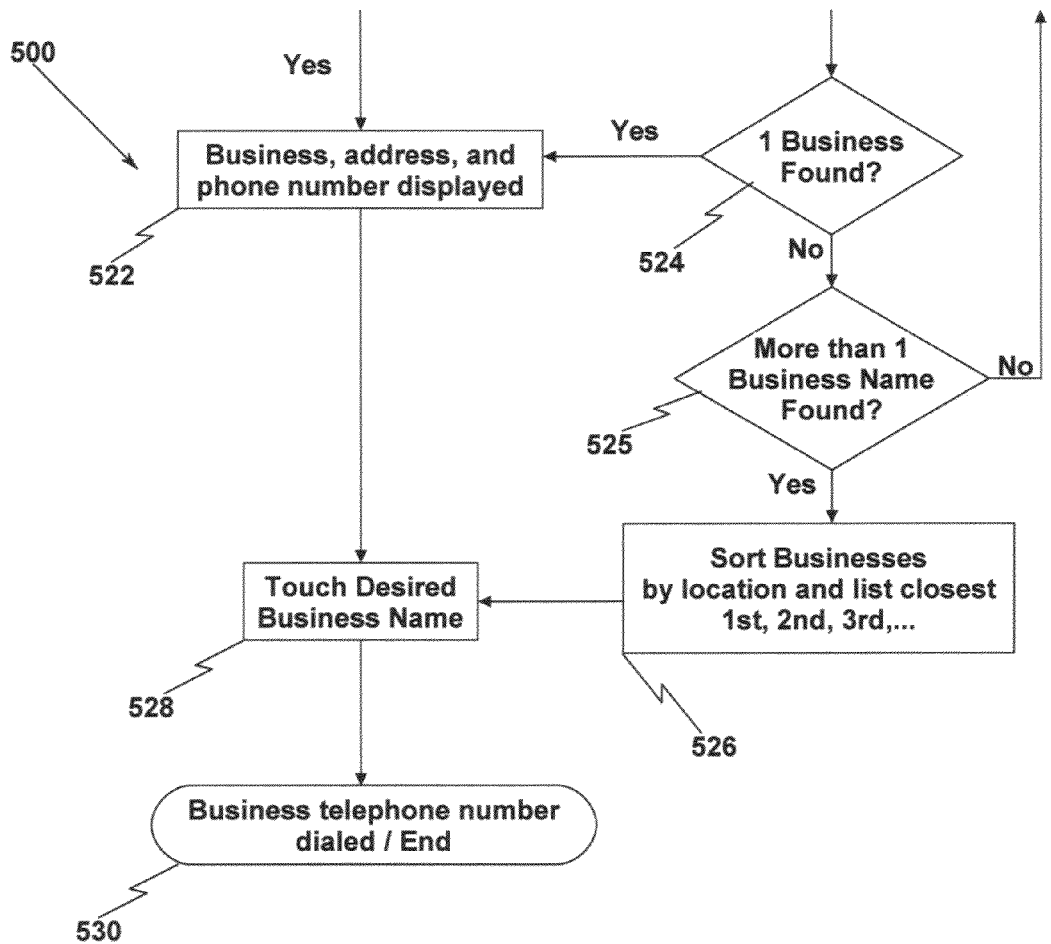

Turning now to FIG. 5, the installation 400 of the business search/auto dial interface application 32 on a smartphone 12 is illustrated. Application 32 is downloaded via the installation platform of smartphone 12 from an application store such as Apple Application Store or Android Play Store (step 402). Application 32 will automatically integrate with some of the main functionalities of smartphone 12 such as the smartphone's 12 keyboard (step 404) and GPS system (step 406). Depending on the smartphone's operating system, application 32 may integrate directly with smartphone's 12 default telephone application (step 408). This integration feature may occur automatically (i.e. outside of the user's control), or alternatively may occur at the user's prompting. If application 32 does integrate directly with the default telephone application, application 32 will also integrate with the smartphone's 12 contact list (step 410), providing the flexibility to allow users to add frequently searched business entities to his/her contacts. A tab will be added to the default phone application of the smartphone adding the functionality of application 32 as one of the main functionalities of the smartphone's 12 default telephone application (step 414), adapting the physical layout of the default telephone application's control features, to best maximize the small physical display area on smartphone 12. The user may now access application 32 directly through the additional tab within the telephone application (step 416). Application 32 is now ready to operate (step 418). If application 32 is not integrated with the default telephone application of smartphone 12 (step 408), an application icon is installed on the smartphone's 12 home screen (step 412). The user may now access application 32 directly through the icon (step 416), and application 32 is now ready to operate (step 418).

A flow diagram generally illustrating the overall process 500 for the automated telephone directory and dialing system is illustrated in FIGS. 6*a*-*b*. Business search/auto dial interface application 32 operates identically whether opened from independent icon (step 504) or opened from telephone application 32 (step 502). As is well known in the art, application 32 is opened by touching the corresponding icon on smartphone's 12 home screen or the appropriate tab within the smartphone's 12 default telephone application. As soon as either the icon or tab is touched the smartphone's 12 default keyboard appears (not illustrated) along with the entry-window 302, search/submission button 304, location entry-window 308, and result-display 306. Location entry-window 308 allows the user to override the smartphone's 12 GPS system. At step 506 the user must decide if he/she wants to search for a business entity outside of his or her physical location (i.e. the physical location of the smartphone 12), and if he or she so desires, enter a location in location entry-window 308 (step 508). If the user wants to search for a business entity within his/her present geographic location (based on the GPS data of smartphone 12), the user simply inputs the name of the business he/she is trying to contact (step 510). Entering the business entity's name (or more than three characters of the business's name) the user presses the search/submission button 304, initializing the search (step 512). If application 32 is integrated within the smartphone's 12 default telephone application (step 514), smartphone's 12 contacts will first be searched (step 516). If the desired business is located (step 518) it will be displayed in the format of business entity name, address, and telephone number (step 522) and displayed within the results-display 306. As soon as the user touches the business entity name (i.e., of the business displayed within results-display 306) (step 528) smartphone 12 will call the business (step 530). The displayed result (i.e. the business entity's name, address, and telephone number) is "linked" to the default telephone application of smartphone 12, providing an executable connection between the displayed result and the default telephone application of smartphone 12. If the desired business is not located within smartphone's 12 contacts, application 32 will next search a remote database (Yellow Pages, for example) (step 520) based on the desired location inputted by the user or the location of smartphone 12. If just one business entity is found (step 524), the business entity's contact information will be displayed in the format of business entity name, address, and telephone number (step 522) within the results-display 306. As soon as the user touches the name (i.e., of the business displayed within results-display 306) (step 528) smartphone 12 will call the business (step 530). If more than one business entity with the same name is found (step 525), the results are ordered based on location and the closest location (i.e. the business that is physically located closest geographically to the smartphone 12 or the location provided by the user) is listed first (step 526). If no business entity is found (step 525) no business names/address/telephone number will be returned, the process will return to step 510, and the user will be prompted to input a different business name.

If application 32 is not integrated into smartphone's 12 default telephone application (step 512), application 32 will not search smartphone's 12 contacts, but will move to step 520, and search the remote yellow pages database. If just one business is found (step 524), the business entity's contact information will be displayed in the format of name, address, telephone number (step 522) within the results-display 306. As soon as the user touches the name (i.e., of the business displayed within results-display 306) (step 528) smartphone 12 will call the business (step 530). If more than one business entity with the same name is found (step 525), the results are ordered based on location and the closest location to the phone or location provided by the user is listed first (step 526). If no business entity is found (step 524), the system will return to step 510 and the user will have to input a different business name.

The disclosure provided above and the examples herein should not be construed as limiting as many variations or embodiments could be made to above subject matter without departing from the scope of the invention. Accordingly, the invention resides in the following claims.

We claim:

1. A method for providing business entity search results to a smartphone, the method comprising the steps of:

downloading a webbased first application on a smartphone;

deciding to integrate said first application with the default telephone second application or to operate said first application as a stand alone application on a smartphone's operating system;

if decided to integrate, select a prompt displayed by said first application to integrate said first application directly with a default telephone second application of the smartphone, allowing the first application to access a contact list of said default telephone second application and installing a tab into default telephone second application to allow the functionality of said first application as one of the main functionalities of the default telephone second application;

if decided to operate said first application as a stand alone application, do not select said prompt;

inputting a business entity search query from an input interface on the smartphone, receiving at a search/content server, said business entity search query from said input interface via a network;

receiving at a search/content server via a network a GPS location, a data of said smartphone, and said smartphone contact list of said default telephone second application if said prompt was selected to integrate said first application with the default telephone second application;

retrieving, by the search/content server, search results from a local database and said smartphone contact list if said first application was integrated with the default telephone second application, said search results based on the business entity search query received from the smartphone;

trimming the search results utilizing JavaScript Object Notation (JSON) by the first application at the search/content server level;

ordering the search results based on said GPS location data of said smartphone at the search/content server level;

providing said search results to said smartphone via the network wherein said smartphone is adapted to display said results in a concise format; and displaying a link, said link being selectable to dial the telephone number of a selected search result.

2. The method of claim 1 wherein retrieving by the search/content server, search results based on the business entity search query received from the smartphone comprises also retrieving the search results from a remote database.

3. The method of claim 1 wherein said concise format is: business entity name, address, and telephone number.

4. The method of claim 1 comprising the additional step of adding said search results individually to said contact list.

5. The method of claim 1 wherein said smartphone is further adapted to display a location-entry window for imputing a physical location remote from said smartphone.

6. The method of claim 1 wherein said search results are ordered based on geographical distance from said smartphone and displayed on said smartphone.

* * * * *